(12) United States Patent
Rozario et al.

(10) Patent No.: US 7,254,651 B2
(45) Date of Patent: Aug. 7, 2007

(54) SCHEDULER FOR A DIRECT MEMORY ACCESS DEVICE HAVING MULTIPLE CHANNELS

(75) Inventors: Ranjit J. Rozario, San Jose, CA (US);
Ravikrishna Cherukuri, San Jose, CA (US)

(73) Assignee: Redback Networks Inc., San Jose, CA (US)

( * ) Notice: Subject to any disclaimer, the term of this patent is extended or adjusted under 35 U.S.C. 154(b) by 470 days.

(21) Appl. No.: 09/740,669

(22) Filed: Dec. 18, 2000

(65) Prior Publication Data

US 2002/0078267 A1 Jun. 20, 2002

(51) Int. Cl.
*G06F 3/00* (2006.01)
(52) U.S. Cl. .................. 710/22; 710/23; 710/28; 710/5; 710/6; 710/52; 710/54
(58) Field of Classification Search ............ 710/20–24, 710/28, 5–6, 52, 54
See application file for complete search history.

(56) References Cited

U.S. PATENT DOCUMENTS

| | | | |
|---|---|---|---|
| 5,504,919 A * | 4/1996 | Lee et al. .................. 710/20 |
| 5,566,350 A | 10/1996 | Takagi et al. |
| 5,828,856 A | 10/1998 | Bowes et al. |
| 5,938,743 A | 8/1999 | Nahidipour et al. |
| 5,983,301 A | 11/1999 | Baker et al. |
| 6,052,375 A | 4/2000 | Bass et al. |

\* cited by examiner

*Primary Examiner*—Kim Huynh
*Assistant Examiner*—Joshua D Schneider
(74) *Attorney, Agent, or Firm*—Blakely, Sokoloff, Taylor & Zafman LLP

(57) ABSTRACT

A scheduler configured to schedule multiple channels of a Direct Memory Access (DMA) device includes a shift structure having entries corresponding to the multiple channels to be scheduled. Each entry in the shift structure includes multiple fields. Each entry also includes a weight that is determined based on these multiple fields. The scheduler also includes a comparison-logic circuit that is configured to then sort the entries based on their respective weights.

24 Claims, 16 Drawing Sheets

SCHEDULER FOR A DIRECT MEMORY ACCESS DEVICE HAVING MULTIPLE CHANNELS

BACKGROUND OF THE INVENTION

1. Field of the Invention

The present application generally relates to a scheduler and more particularly to a scheduler for a Direct Memory Access (DMA) device having multiple channels.

2. Description of the Related Art

In general, the Direct Memory Access (DMA) of a device controls the transfer of data between peripheral devices and the memory of the device. The device may include an input DMA and an output DMA to service data received from peripheral devices and data sent to peripheral devices, respectively. When a peripheral device wants to send data to a device with an input DMA, the peripheral device sends a request to the input DMA. The input DMA can then send an Acknowledgement (ACK) to the peripheral. When the peripheral device receives the ACK, it transfers data to the input DMA, which then transfers the data into memory. When data is to be sent out to a peripheral device, the processor of the device sends a request to the output DMA. The output DMA then retrieves data from memory and sends it out to the peripheral device.

Conventional DMAs typically have multiple channels that can be connected to multiple peripherals, multiple channels on one peripheral, or to multiple memory channels on the device. Conventional DMAs also typically have arbitrators or schedulers to control these multiple channels. However, as the number of channels on DMAs has increased, the complexity of these arbitrators/schedulers has also increased. This can increase the cost and reduced the processing speed of the DMA.

SUMMARY OF THE INVENTION

The present invention relates to a scheduler for scheduling multiple channels of a Direct Memory Access (DMA) device. In accordance with one aspect of the present invention, a scheduler includes a shift structure having entries corresponding to the multiple channels to be scheduled. Each entry in the shift structure includes multiple fields. Each entry also includes a weight that is determined based on these multiple fields. The scheduler also includes a comparison-logic circuit that is configured to then sort the entries based on their respective weights.

DESCRIPTION OF THE DRAWING FIGURES

The present invention can be best understood by reference to the following description taken in conjunction with the accompanying drawing figures, in which like parts may be referred to by like numerals:

DETAILED DESCRIPTION OF EXEMPLARY EMBODIMENTS

In order to provide a more thorough understanding of the present invention, the following description sets forth numerous specific details, such as specific configurations, parameters, and the like. It should be recognized, however, that such description is not intended as a limitation on the scope of the present invention, but is intended to provide a better description of exemplary embodiments.

Figure 1:
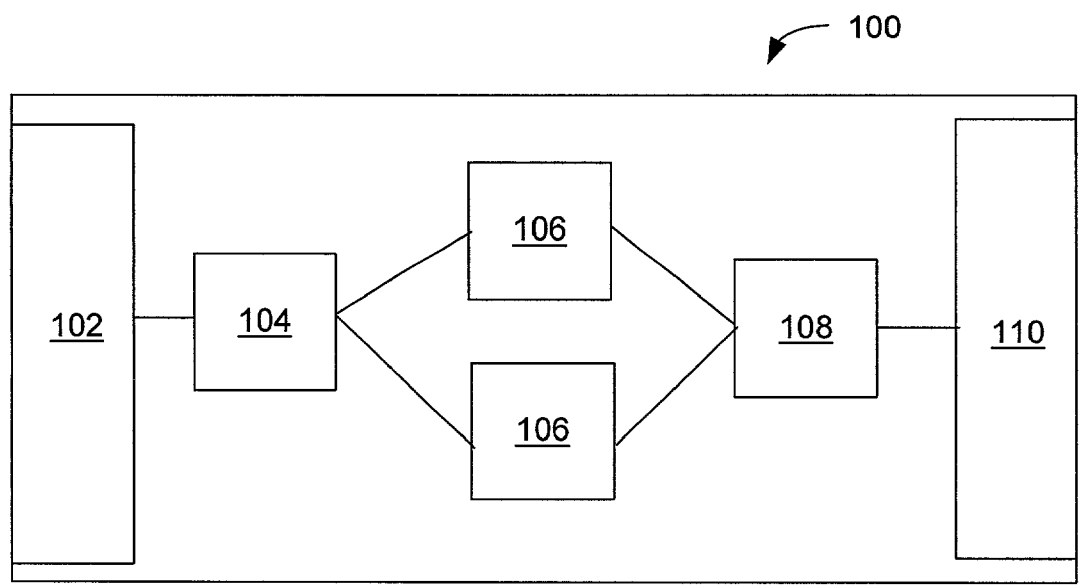
FIG. 1 is a block diagram of a line card.

With reference to FIG. 1, a line card 100 is depicted. In accordance with one aspect of the present invention, line card 100 can be connected to various peripheral devices, such as framer devices. As such, line card 100 can receive and send various types of signals, such as circuit-switched signals, packet signals, and the like.

With continued reference to FIG. 1, line card 100 includes a line interface 102, a framer ASIC 104, packet processor ASICs (PPAs) 106, a packet mesh ASIC (PMA) 108, and a backplane interface 110. Line interface 102 can be configured to connect to any number of framer devices. Backplane interface 110 can be configured to connect to any number of additional line cards on a mesh, a common bus, and the like. As such, signals can be received from framer devices connected to line interface 102, then sent to other line cards through backplane interface 110. Additionally, signals from other line cards can be received through backplane interface 110, then sent to a framer device connected to line interface 102.

As described above, line card 100 can receive various types of signals. Line card 100 can also receive mixed signals, such as a mix of circuit-switched signals and packet signals. As such, framer ASIC 104 can be configured to separate packet signals, then pass them onto PPAs 106 for processing.

As also described above, signals can be received from line interface 102 and sent out backplane interface 110. Additionally, signals can be received from backplane interface 110 and sent out line interface 102. As such, in the configuration depicted in FIG. 1, one PPA 106 can be configured as an egress PPA, which services signals being sent out line interface 102, and the other PPA 106 can be configured as an ingress PPA, which services signals being received from line interface 102. It should be recognized, however, that a single PPA 106 can be configured as both an egress and an ingress PPA. It should be further recognized that line card 100 can be configured with any number of PPAs 106 configured as any number of ingress and egress PPAs.

After a packet is processed by the ingress PPA 106, it can then be sent out on backplane interface 110 by PMA 108. When a packet is received on backplane interface 110, it can be forwarded by PMA 108 to the egress PPA 106. The packet is then processed and sent out through line interface 102. As noted above, a single PPA 106 can be used as both an ingress and an egress PPA.

Figure 2:
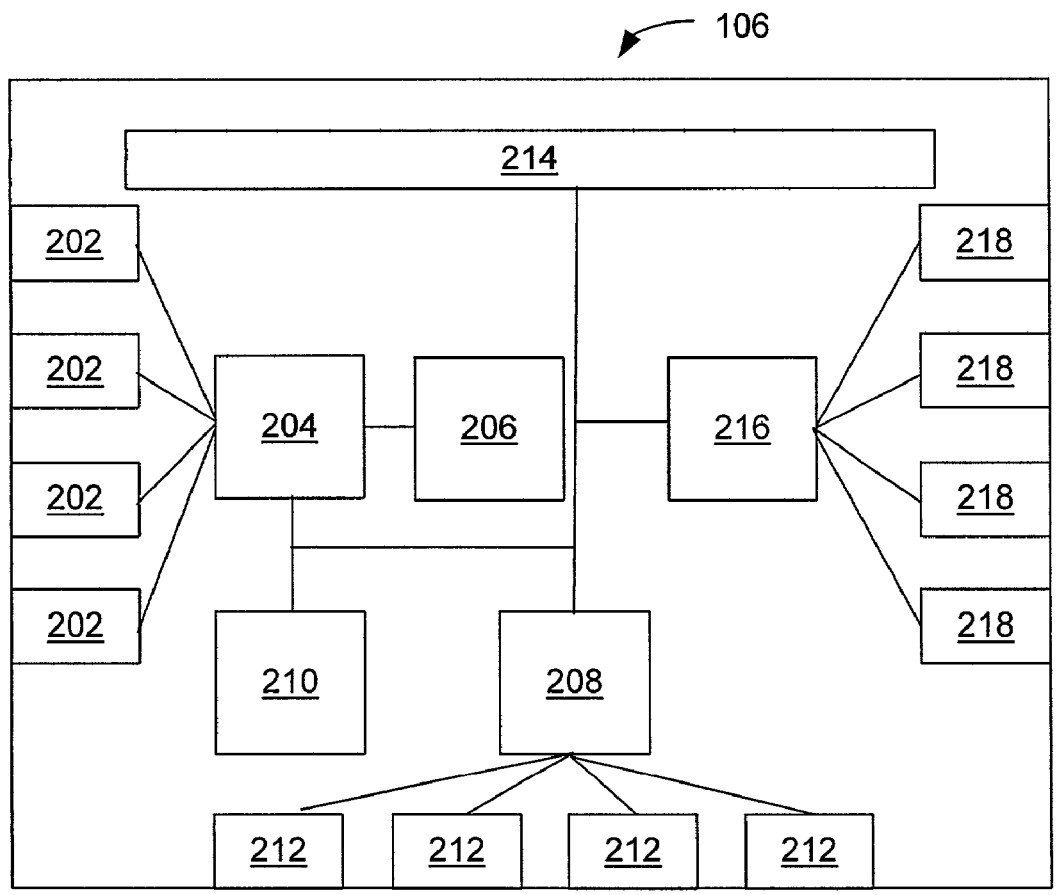
FIG. 2 is a block diagram of a packet processing ASIC (PPA)

With reference now to FIG. 2, PPA 106 is shown in greater detail. More particularly, PPA 106 includes LIP (Line Interface Protocol) interfaces 202, an input DMA 204, an input-descriptor queue 206, a memory controller 208, a Free Memory Manager (FMG) 210, memory channels 212, Execution Units (EUs) 214, an output DMA 216, and LIP interfaces 218.

As described earlier, PPA 106 is configured to process packet signals. More particularly, a packet is first received through LIP interface 202. Input DMA 204 is configured to create a descriptor of the received packet. This descriptor is then stored in input-descriptor queue 206. Input DMA 204 also obtains from FMG 210 the location of available space in memory (i.e., free memory), then stores the packet in memory. EUs 214 then access the stored packet using the descriptor stored in input-descriptor queue 206. The retrieved packet is then processed by EUs 214 in accordance with software instructions loaded on EUs 214. After the packet is processed, EUs 214 create an output descriptor for the packet. As will be described in greater detail below, EUs 214 then write the output descriptor into a queue in output DMA 216. The packet is then sent out through LIP interfaces 218.

As described above, LIP interfaces 202 receives packets. More particularly, in one embodiment of the present invention, LIP interfaces 202 operate at about 16 bits at every 200 megahertz. Additionally, although four LIP interfaces 202 are depicted in FIG. 2, it should be recognized that PPA 106 can include any number of LIP interfaces 202 depending on the particular application.

As also described above, packets are stored in memory. It should be recognized, however, that various information (e.g., forwarding tables, the software program executed on EUs 214, and the like) can also be stored in memory.

As depicted in FIG. 2, in one exemplary embodiment of the present invention, PPA 106 includes four memory channels 212. Each memory channel 212 can be connected to any number of memory devices, which can be physically located on line card 100 (FIG. 1) but not directly on PPA 106. For example, in the present embodiment, each memory channel 212 is connected to a plurality of Dynamic Random Access Memories (DRAMs). More particularly, these DRAMS can include 100 megahertz DDR (Double Data Rate) SDRAMs (Synchronized DRAMs). It should be recognized, however, that various memory devices running at various speeds can be used.

In the present embodiment, PPA 106 can also include memory controller 208. Memory controller 208 can be configured to communicate with various blocks in PPA 106 (e.g., input DMA 204, FMG 210, EUs 214, output DMA 216, and the like) to provide access to memory. For the sake of clarity, in FIG. 2, memory controller 208 is depicted as a single block separate from memory channels 212. It should be recognized, however, that a separate memory controller 208 can be dedicated to each memory channel 212. Additionally, it should be recognized that memory controller 208 can be located within each memory channel 212.

In accordance with one aspect of the present invention, packets are stored in memory in 256-byte increments called Memory Data Units (MDUs). Additionally, in one embodiment, about 128 megabytes of memory are dedicated to storing MDUs, which is equivalent to about half a million MDUs. It should be recognized, however, that packets can be stored in any increments. It should be further recognized that any amount of memory space can be dedicated to storing packets.

As described above, when input DMA 204 receives a packet, it stores the packet in memory. More particularly, input DMA 204 obtains from FMG 210 free MDUs to store the packet in memory. Accordingly, FMG 210 is configured to keep track of which MDUs are free and which are being used. As described earlier, an MDU is 256-bytes long. If a packet is longer than 256-bytes, then input DMA 204 allocates the appropriate number of additional MDUs to store the packet. Input DMA 204 then creates a link list of MDUs. For a more detailed description of output FMG 210 see U.S. patent application Ser. No. 09/740,670, entitled "Free Memory Manager Scheme and Cache", filed on Dec. 18, 2000, the entire content of which is incorporated by reference.

As described above, input DMA 204 also creates a descriptor for each packet. Input DMA 204 then stores the descriptor in input-descriptor queue 206. In one embodiment of the present invention, the descriptor is about 64-bits (i.e., 8-bytes) long and includes fields such as location of the first MDU for the packet in memory, length of the packet, and the like. It should be recognized, however, that a descriptor can be any length and can include any number and type of fields.

As described above, EUs 214 retrieve the stored packet and process it. More particularly, EUs 214 read a descriptor out of input-descriptor queue 206. EUs 214 then retrieve the packet from memory using the descriptor. For example, EUs 214 can read the descriptor for a pointer to the first MDU containing the packet. EUs 214 can read the header of the packet, parse it, and classify the packet. EUs 214 can then modify certain fields of the packet before sending out the packet. In one embodiment of the present invention, EUs 214 include 16 Reduced Instruction Set Computer (RISC) processors. For a more detailed description of output EUs 214 see U.S. patent application Ser. No. 09/740,658, entitled "Cache Retry Request Queue", filed on Dec. 18, 2000, the entire content of which is incorporated by reference. It should be recognized, however, that EUs 214 can include any number and types of processors. Additionally, it should be recognized that EUs 214 can execute various software programs to process the packets in various manner.

As described above, when the packet is to be sent out, EUs 214 create an output descriptor, which can be based on the initial descriptor created for the packet. This output descriptor is written to a queue in output DMA 216, which then sends the packet out on LIP interfaces 218.

Figure 3:
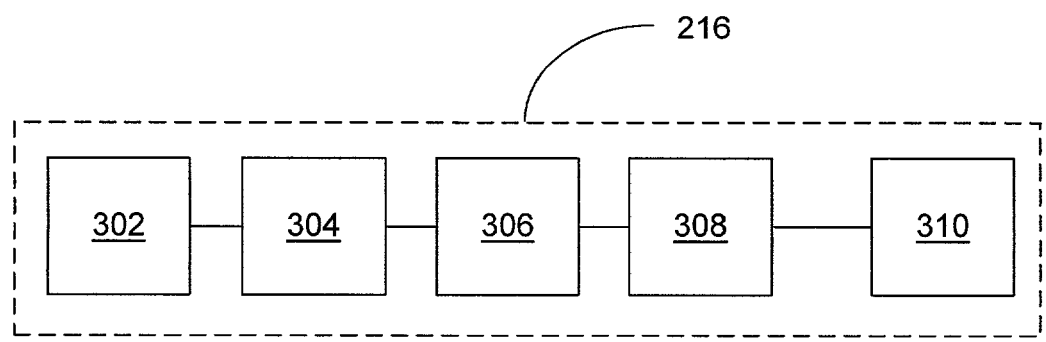
FIG. 3 is a block diagram of an output DMA.

With reference now to FIG. 3, output DMA 216 is shown in greater detail. In the following description output DMA 216 will be referred to as line output block (LOP) 216. It should be recognized that output DMA (LOP) 216 can be referred to by various terms.

In one exemplary embodiment of the present invention, LOP 216 includes a queue 302, a DRAM read logic (DRL) 304, a local storage (LST) 306, a port scheduler and FIFO (PSF) 308, and a port 310. As alluded to earlier, when a packet is to be sent out, EUs 214 (FIG. 2) write an output descriptor of the packet to queue 302. DRL 304 reads the descriptor out of queue 302 and makes direct memory (dm) requests to fetch the packet out of memory channels 212 (FIG. 2). The retrieved packet is then stored in LST 306. PSF 308 reads the packet out of LST 306, then sends it onto port 310.

Figure 4:
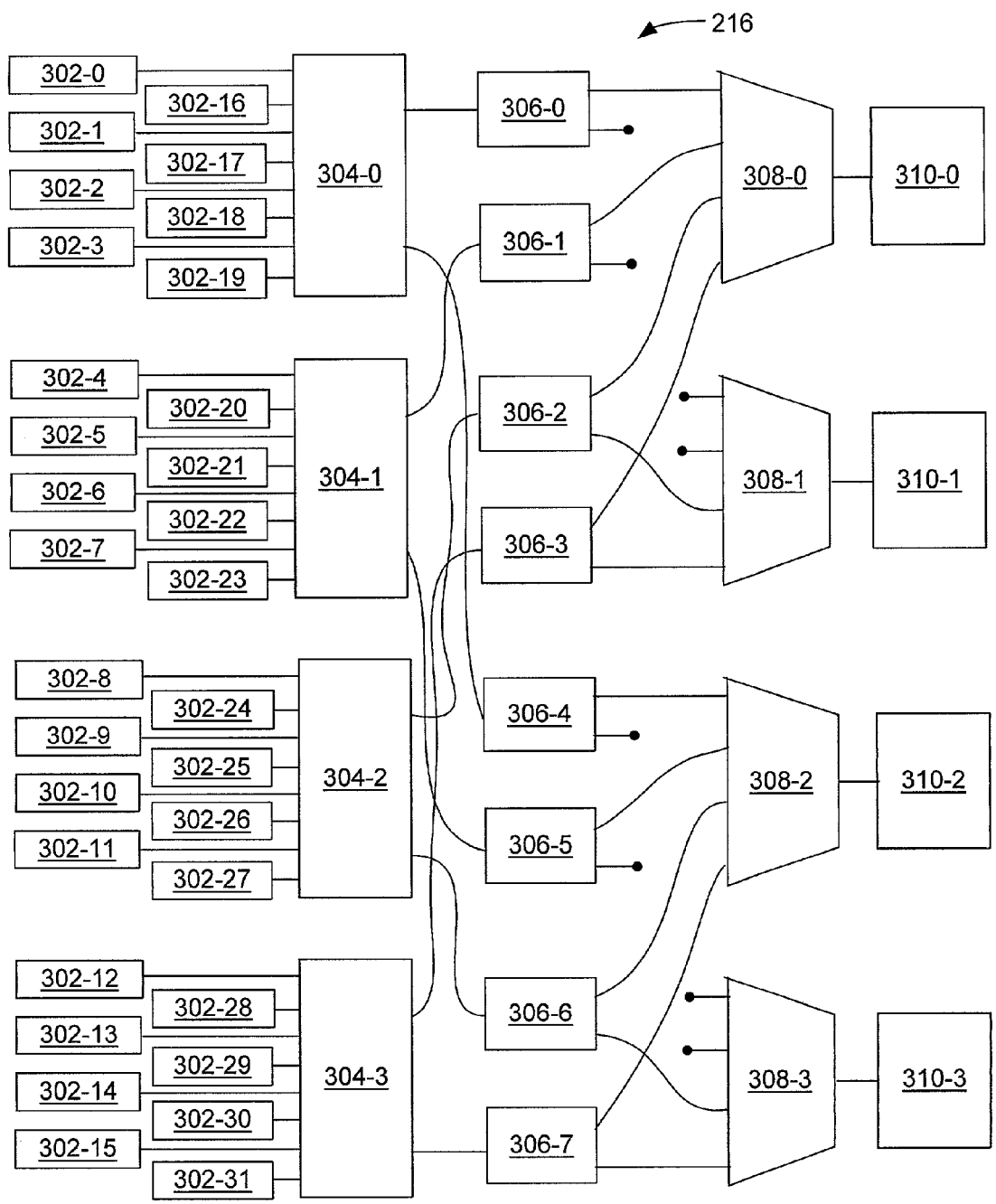
FIG. 4 is another block diagram of the output DMA depicted in FIG. 3.

With reference now to FIG. 4, in the present embodiment, LOP 216 can be configured with 32 channels. As such, LOP 216 includes 32 queues 302 (i.e., queues 302-0 through 302-31), which correspond to each channel. More particularly, queues 302-0 through 302-31 correspond to channels 0 through 31, respectively. It should be recognized, however, that LOP 216 can be configured with any number of channels depending on the particular application. Similarly, it should be recognized that LOP 216 can include any number of queues 302 depending on the particular application. Additionally, it should be recognized that queues 302 can be mapped to the channels of LOP 216 using various mapping schemes. Moreover, this mapping scheme can be altered either through hardware and/or software.

As depicted in FIG. 4, LOP 216 also includes four DRLs 304 (i.e., DRLs 304-0 through 304-3). In the present embodiment, each DRL 304 is configured to service up to eight channels. More particularly, DRL 304-0 is configured to service channels 0 to 3 and channels 16 to 19. As such, DRL 304-0 is connected to queues 302-0 through 302-3 and queues 302-16 through 302-19. DRL 304-1 is configured to service channels 4 to 7 and channels 20 to 23. As such, DRL 304-1 is connected to queues 302-4 to 302-7 and queues 302-20 to 302-23. DRL 304-2 is configured to service channels 8 to 11 and channels 24 to 27. As such, DRL 304-2 is connected to queues 302-8 to 302-11 and queues 302-24 to 302-27. DRL 304-3 is configured to service channels 12 to 15 and channels 28 to 31. As such, DRL 304-3 is connected to queues 302-12 to 302-15 and queues 302-28 to 302-31. It should be recognized that LOP 216 can include any number of DRLs 304. It should be recognized that each LOP 216 can be configured to service any number of queues 302 or channels. It should be further recognized that DRLs 304 can be mapped to queues 302 or the channels of LOP 216 using various mapping schemes. Moreover, this mapping scheme can be altered either through hardware and/or software.

As depicted in FIG. 4, LOP 216 also includes eight LSTs 306 (i.e., LSTs 306-0 to 306-7). In the present embodiment, each LST 306 is configured to service up to four channels. More particularly, LST 306-0 is configured to service channels 0 to 3. As such, LST 306-0 is connected to DRL 304-0. LST 306-1 is configured to service channels 4 to 7. As such, LST 306-1 is connected to DRL 304-1. LST 306-2 is configured to service channels 8 to 11. As such, LST 306-2 is connected to DRL 304-2. LST 306-3 is configured to service channels 12 to 15. As such, LST 306-3 is connected to DRL 304-3. LST 306-4 is configured to service channels 16 to 19. As such, LST 306-4 is connected to DRL 304-0. LST 306-5 is configured to service channels 20 to 23. As such, LST 306-5 is connected to DRL 304-1. LST 306-6 is configured to service channels 24 to 27. As such, LST 306-6 is connected to DRL 304-2. Finally, LST 306-7 is configured to service channels 28 to 31. As such, LST 306-7 is connected to DRL 304-3. It should be recognized that LOP 216 can include any number of LSTs 306. It should be recognized that LST 306 can be configured to service any number of channels and DRLs 304. It should be further recognized that LSTs 306 can be mapped to DRLs 304 using various mapping schemes. Moreover, this mapping scheme can be altered either through hardware and/or software.

As depicted in FIG. 4, LOP 216 includes four PSFs 308 (i.e., PSFs 308-0 to 308-3). In the present embodiment, each PSF 308 can be configured to service up to 16 channels. However, in the configuration depicted in FIG. 4, PSFs 308-0 and 308-2 are configured to service up to 16 channels, but PSFs 308-1 and 308-3 are configured to service up to 8 channels. More particularly, PSF 308-0 is configured to service channels 0 to 15. As such, PSF 308-0 is connected to LSPs 306-0, 306-1, 306-2, and 306-3. PSF 308-1 is configured to service channels 8 to 15. As such, PSF 308-1 is connected to LSPs 306-2 and 306-3. It should be recognized, however, that PSF 308-1 can be configured to service channels 0 to 15 by connecting it to LSPs 306-0 and 306-1. PSF 308-2 is configured to service channels 16 to 31. As such, PSF 308-2 is connected to LSPs 306-4, 306-5, 306-6, and 306-7. PSF 308-3 is configured to service channels 24 to 31. As such, PSF 308-3 is connected to LSPs 306-6 and 306-7. It should be recognized, however, that PSF 308-3 can be configured to service channels 16 to 31 by connecting it to LSPs 306-4 and 306-5. It should be recognized that LOP 216 can include any number of PSFs 308. It should be recognized that PSF 308 can be configured to service any number of channels and connected to any number of LSTs 306. It should be further recognized that PSFs 308 can be mapped to LSTs 306 using various mapping schemes. Moreover, this mapping scheme can be altered either through hardware and/or software.

As depicted in FIG. 4, LOP 216 includes four ports 310 (i.e., ports 310-0 to 310-3). In the present embodiment, each port can be configured to service up to 16 channels. As such, ports 310-0 to 310-3 are connected to PSFs 308-0 to 308-3, respectively. As described above, however, in the configuration depicted in FIG. 4, PSFs 308-1 and 308-3 are configured to service up to 8 channels rather than 16 channels. As alluded to above, however, PSFs 308-1 and 308-3 can be configured to service up to 16 channels. As such, ports 310-1 and 310-3 can be configured to service up to 16 channels. It should be recognized that LOP 216 can include any number of ports 310. It should be recognized that ports 310 can be configured to service any number of channels and connected to any number of PSFs 308. It should be further recognized that ports 310 can be mapped to PSFs 308 using various mapping schemes. Moreover, this mapping scheme can be altered either through hardware and/or software.

Although LOP 216 has been described as having four ports 310 and 32 channels, it should be recognized that not all the ports and channels need be used. For example, assume that in one application that only one port 310 is used and only 16 channels are enabled. More particularly, assume that port 310-0 is used and that channels 0 to 15 are enabled. In the configuration described above, note that all four DRLs 304 can send four requests simultaneously to port 310-0. More particularly, DRLs 304-0, 304-1, 304-2, and 304-3 can send requests on channels 0 to 3, 4 to 7, 8 to 11, and 12 to 15, respectively. If the assignment of channels to DRLs 304-0 to 304-3 had be sequential (i.e., channels 0–7 assigned to DRL 304-0, channels 8 to 15 assigned to DRL 304-1, channels 16 to 23 assigned to DRL 304-2, and channels 24 to 31 assigned to DRL 304-3), then only DRLs 304-0 and 304-1 could have been used.

Figure 5:
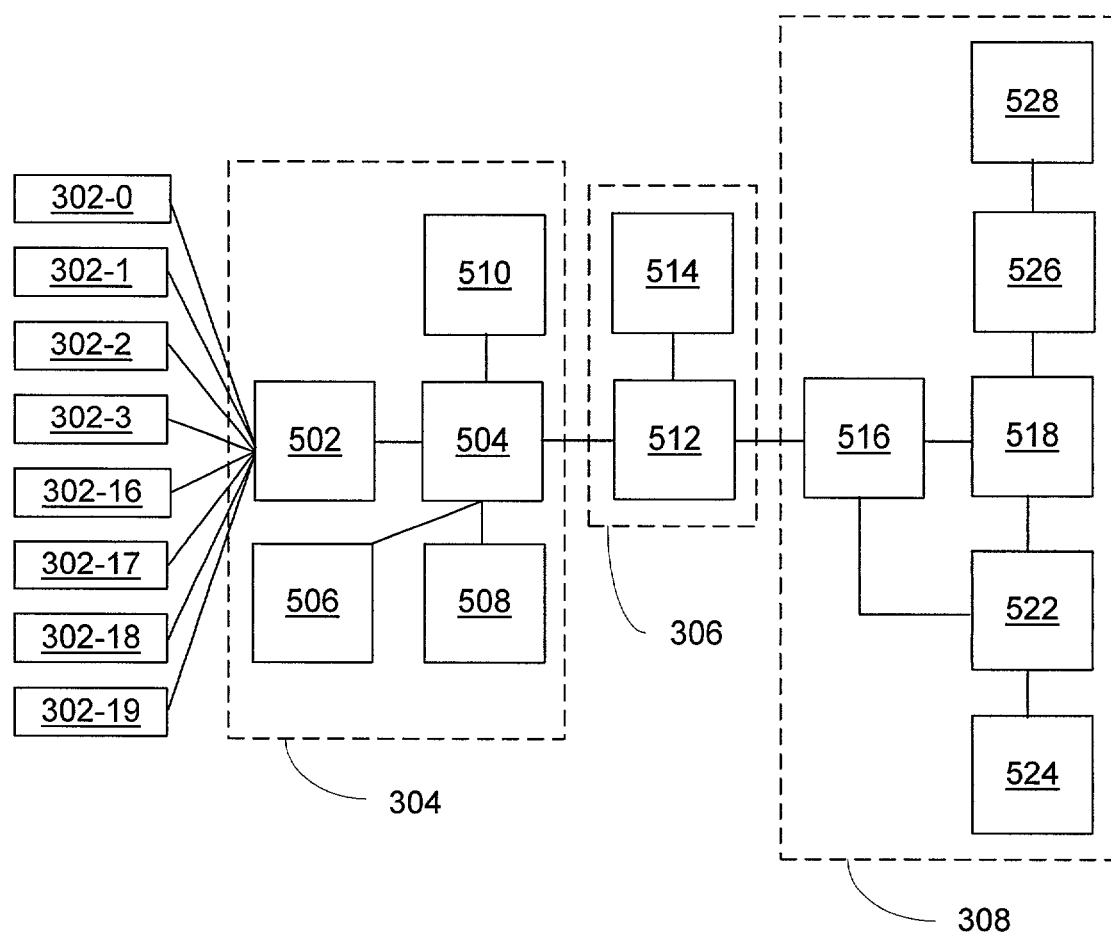
FIG. 5 is still another block diagram of the output DMA depicted in FIG. 3.

With reference now to FIG. 5, as alluded to above, each DRL 304 is configured to service up to eight channels. As such, in the present embodiment, each DRL 304 includes a scheduler 508 configured to schedule processing of these channels. As depicted in FIG. 5, each DRL 304 also includes a request manager (RQM) 502, a DRAM read control (DRC) 504, a DRAM read sequencer (DRS) 506, and a perMDU (pMDU) 510.

Figure 6:
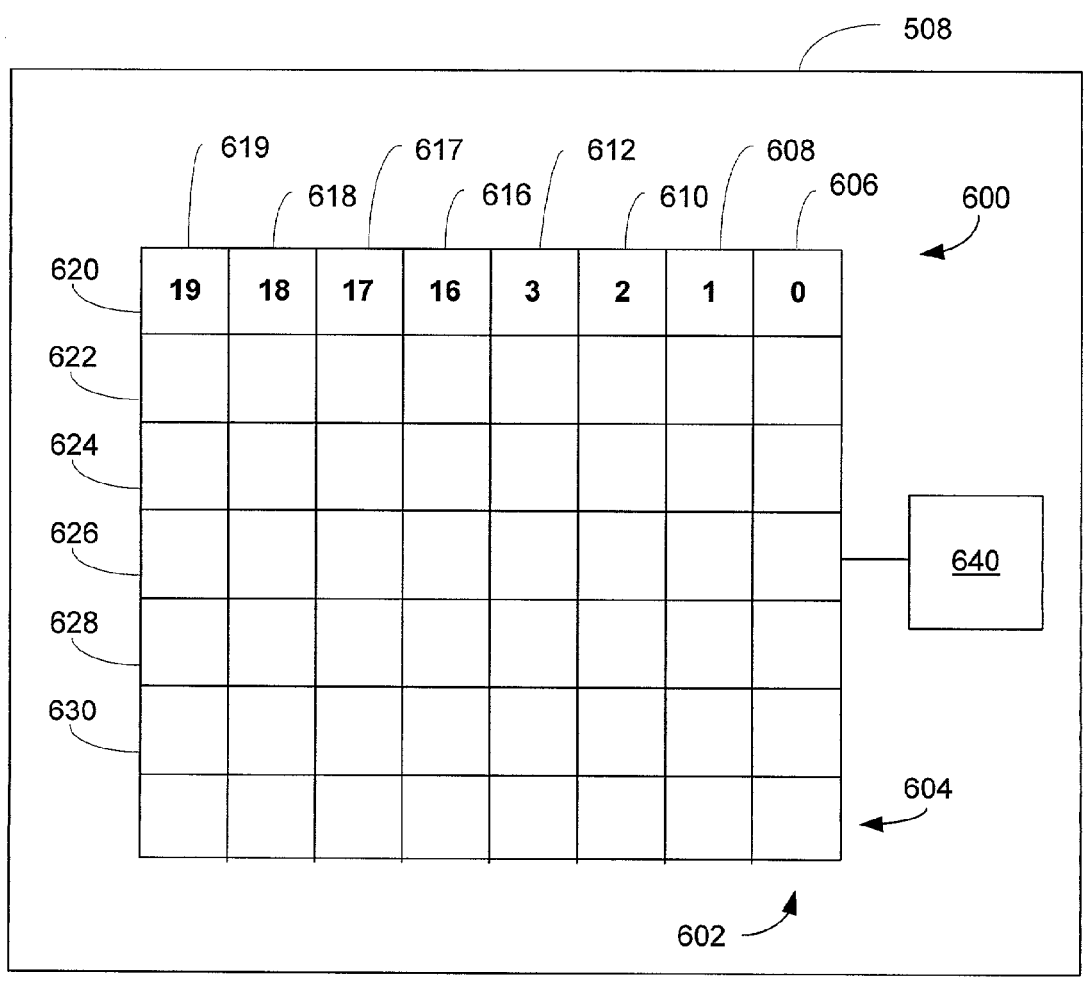
FIG. 6 is a diagram of a scheduler in accordance with one embodiment of the present invention.

With reference now to FIG. 6, in the present embodiment, scheduler 508 can include a shift structure 600, such as a First-In-First-Out (FIFO) memory, shift registers, and the like. As depicted in FIG. 6, shift structure 600 includes columns (entries) 602 that correspond to the channels serviced by scheduler 508. As described above, each DRL 304 (FIG. 5) can be configured to service eight channels. Accordingly, shift structure 600 includes eight entries 602. It should be recognized, however, that shift structure 600 can include any number of entries 602 depending on the particular application.

For the sake of convenience and clarity, the following description and the corresponding drawings, describe and depict shift structure 600 associated with DRL 304-0 (FIG. 4). In the present embodiment, DRL 304-0 (FIG. 4) is configured to service channels 0 to 3 and channels 16 to 19. As such, shift structure 600 includes entries 606, 608, 610, 612, 616, 617, 618, and 619 corresponding to channels 0 to 3 and channels 16 to 19, respectively. It should be recognized, however, that each DRL 304 (FIG. 4) includes a shift structure 600 having entries 602 corresponding to the appropriate channels serviced by each DRL 304 (FIG. 4).

As depicted in FIG. 6, each entry 602 includes a plurality of fields 604. In the present embodiment, entries 602 include a channel number field 620, a priority field 622, a packet-in-flight field 624, an output-ready field 626, an input-ready field 628, and an enable field 630. It should be recognized, however, that entries 602 can include any number of fields 604 depending on the particular application.

Channel number field 620 can be configured to indicate the channel number that the packet is to be transmitted. As alluded to earlier, software can provide this information. In the present embodiment, DRL 304-0 (FIG. 4) is configured to service channels 0 to 3 and channels 16 to 19. As such, shift structure 600 includes entries 602 having channel number field 620 with channel numbers 0 to 3 and channel numbers 16 to 19.

Enable field 630 can be configured to indicate if a channel is enabled. As alluded to above, shift structure 600 is configured to service channels 0 to 3 and channels 16 to 19. Any number of these channels can be enabled or disabled depending on the particular application. For example, assume that only channels 0, 2, and 17 are to be used. As such, enable fields 630 would be enabled for entries 606, 610, and 617 for channels 0, 2 and 17, respectively. Enable fields 630 would be disabled for entries 608, 612, 616, 618, and 619 for channels 1, 3, 16, 18 and 19, respectively. Enable fields 630 can be set during initial configuration of PPA 106 (FIG. 1). It should be recognized, however, that enable fields 630 can be set at any convenient time.

In the present embodiment, output-ready field 626 can be configured to indicate that LST 306 (FIG. 5) is ready to receive data. As described above, with reference to FIG. 4, each DRL 304 is connected to a number of LSTs 306. Additionally, LST 306-0 is configured to store data for channels 0 to 3. LST 306-4 is configured to store data for channels 16-19. Accordingly, with reference again to FIG. 6, if an entry 602 is configured to service channel 17, then output-ready field 626 for that entry indicates the status of LST 306-4 (FIG. 4).

Input-ready field 628 can be configured to indicate that there is a descriptor in queue 302 (FIG. 5) to be read by RQM 502 (FIG. 5). As described above, when a packet is to be sent out, software writes a descriptor of the packet into queue 302. In the present embodiment, queue 302 (FIG. 5) then sets the appropriate input-ready field 628 in scheduler 508 (FIG. 5). For example, assume that a packet is to be sent out on channel 17. As described earlier, in the present embodiment, the descriptor of this packet is written in queue 302 assigned to channel 17. In this example, the descriptor is written to queue 302-17 (FIG. 5). The appropriate input-ready field 628 of entry 602 in scheduler 508 would then be set for channel 17. In this example, input-ready field 628 of entry 617 would be set.

Packet-in-flight field 624 can be configured to indicate if a packet is in-flight. A packet is considered to be in-flight when the packet is being processed, such as if a packet is being read out of memory, being sent out onto the bus, and the like.

Priority field 622 can be configured to indicate the priority of the channels. In one configuration, scheduler 508 can be configured with a 6-bit priority field 622. Accordingly, up to 64 different levels of priority can be specified. As will be described in greater detail below, entries 602 with higher priorities are serviced ahead of entries 602 with lower priorities. In one embodiment of the present invention, priority fields 622 are set during initial configuration of PPA 106 (FIG. 1). It should be recognized, however, that priority fields 622 can be set at any convenient time.

Scheduler 508 also includes a comparison-logic circuit 640 configured to sort entries 602. In the present embodiment, a weight is determined for each entry 602 based on fields 604. More particularly, the weight of an entry 602 is a 10-bit number. The most-significant bit of these 10-bits is assigned to enable field 630. The second-most-significant bit is assigned to output-ready field 626. The third-most-significant bit is assigned to input-ready field 628. The fourth-most-significant bit is assigned to in-flight field 624. The remaining six bits are assigned to priority field 622.

As such, in the present embodiment, an entry 602 with an in-flight field 624 enabled, meaning that a packet is in flight, is sorted ahead of an entry 602 with an in-flight field 624 disabled, regardless of their respective priorities. An entry 602 with an input-ready field 628 enabled is sorted ahead of an entry 602 with an input-ready field 628 disabled, regardless of their in-flight fields 624 and their respective priorities. An entry 602 with an output-ready field 626 enabled is sorted ahead of an entry 602 with an output-ready field 626 disabled, regardless of the their input-ready fields 628, in-flight fields 624, and their respective priorities. An entry 602 with an enabled field 630 is sorted ahead of an entry 602 with an enabled field 630 disabled, regardless of their output-ready fields 626, input-ready fields 628, in-flight fields 624, and their respective priorities.

In this manner, entries 602 can be sorted utilizing a single-tier comparison, meaning that two entries 602 can be sorted by comparing their respective weights. In contrast, if two entries are sorted by comparing their respective fields 604, then 5-tiers of comparison or more can be needed. It should be recognized, however, that entries 602 can be sorted using various comparison schemes. For example, entries 602 can be sorted by comparing their respective weights and any number of their respective fields 604. Additionally, in determining the weights of entries 602, some but not all of their respective fields 604 can be used.

Figure 7:
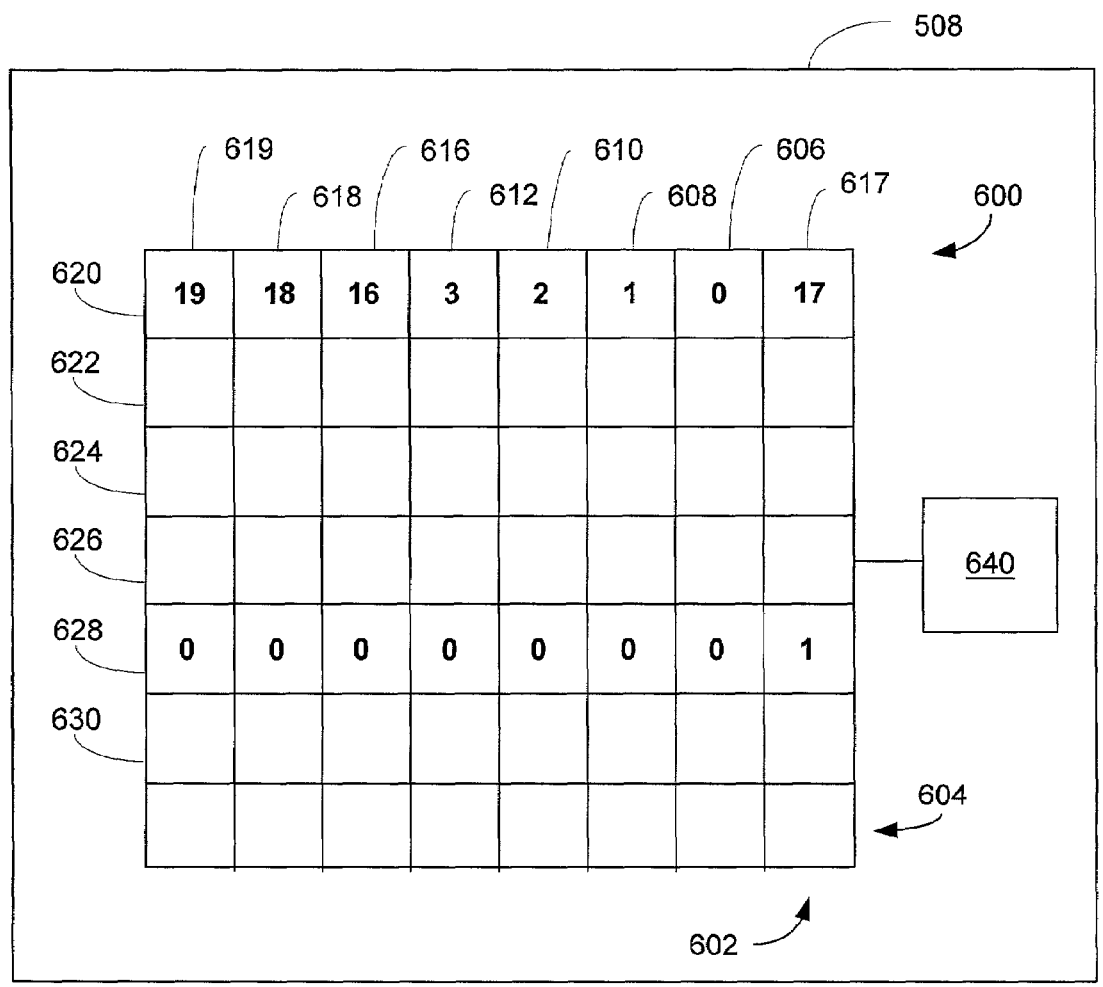
FIG. 7 is another diagram of the scheduler depicted in FIG. 6.

With reference to FIG. 6, assume that the position occupied by column 606 is the head of shift structure 600 and that the position occupied by column 619 is the end of shift structure 600. Now, assume that entry 617 is the only entry 602 with input-ready field 628 enabled. Accordingly, with reference now to FIG. 7, comparison-logic circuit 640 shifts entry 617 to the head of shift structure 600. In FIG. 7, an enabled input-ready field 628 is indicated with a "1" while a disabled input-ready field 628 is indicated with a "0". It should be recognized, however, that any type of indicator can be used.

In the present embodiment, DRC 504 (FIG. 5) can be configured to read from the head of shift structure 600. As such, in this example, DRC 504 (FIG. 5) reads entry 617. As described above, entry 617 includes channel number field 620 that indicates channel 17. As such, with reference now to FIG. 5, DRC 504 instructs RQM 502 to read from queue 302 associated with the channel number indicated by the channel number field 620 (FIG. 7) of the entry at the head of shift structure 600. In this example, DRC 504 instructs RQM 502 to read queue 302-17.

Based on the information contained in the descriptor, DRC 504 then issues a direct memory (dm) request to retrieve the packet associated with the descriptor. More particularly, the descriptor can contain the memory location where the packet is stored. DRC 504 then issues a dm request to memory controller 208 (FIG. 2) using that address. The retrieved packet or a portion of the packet is then written to LST 306. In this example, the retrieved packet or a portion of the packet is written to LST 306-4 (FIG. 4).

As alluded to earlier, in one embodiment of the present invention, packets are processed in 32-byte increments called MDUs. As such, DRC 504 is configured to determine if a packet exceeds 32-bytes in length. For example, the descriptor retrieved from queue 302 can contain the length of the packet. DRC 504 can examine this information to determine if the packet exceeds 32-bytes in length.

Figure 8:
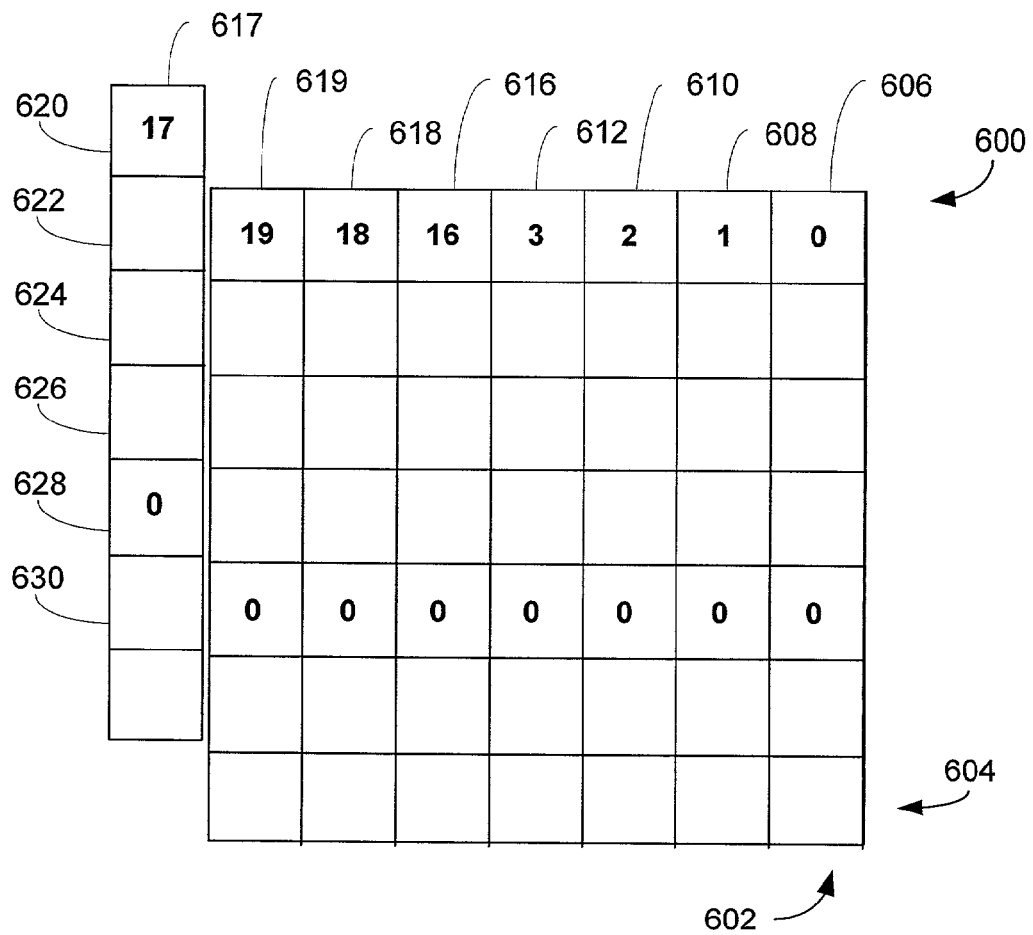
FIGS. 8, 9A and 9B, 10–14 are additional diagrams of the scheduler depicted in FIG. 6.

Assume in this example that the packet is less than or equal to 32-bytes in length. DRC 304 then writes entry 617 (FIG. 7) back into scheduler 508 with input-ready field 628 (FIG. 7) disabled. Additionally, with reference to FIG. 8, as all the entries 602 have input-ready fields 628 disabled, entry 617 is written to the end of shift structure 600. With reference now to FIG. 5, DRC 504 deletes queue 302-17, which contained the descriptor of the packet.

Figure 9A:
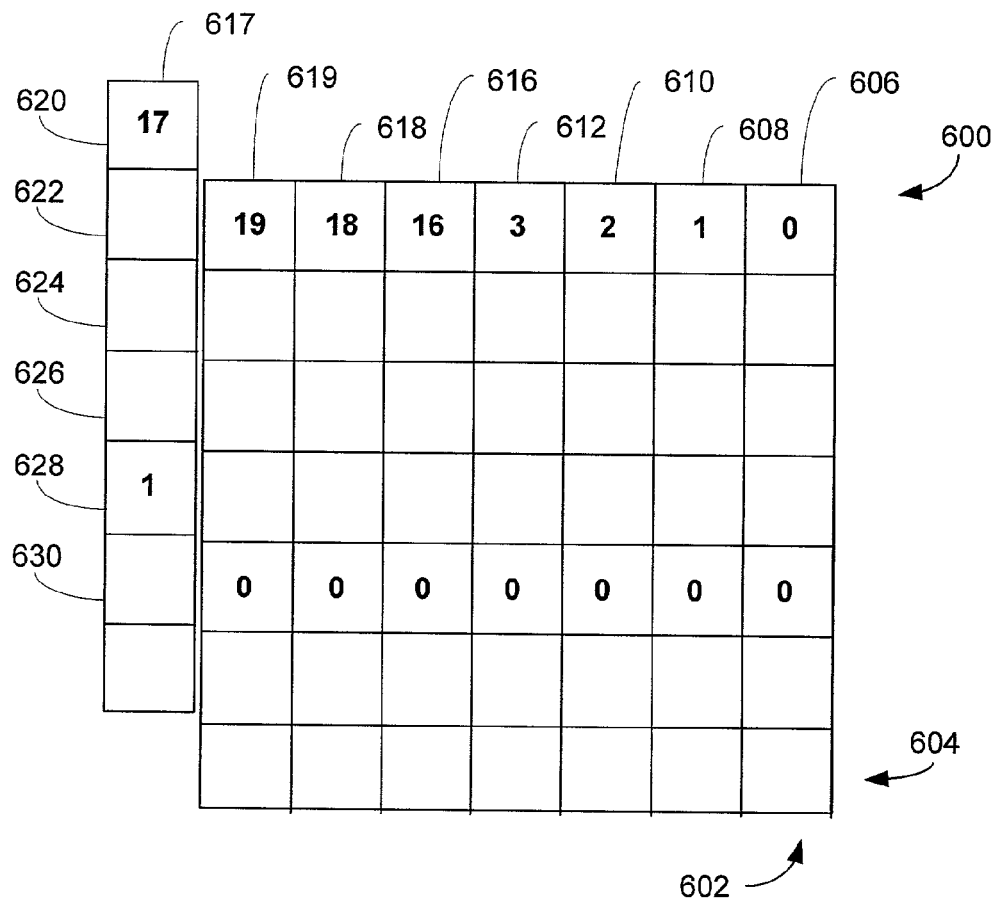
Figure 9B:
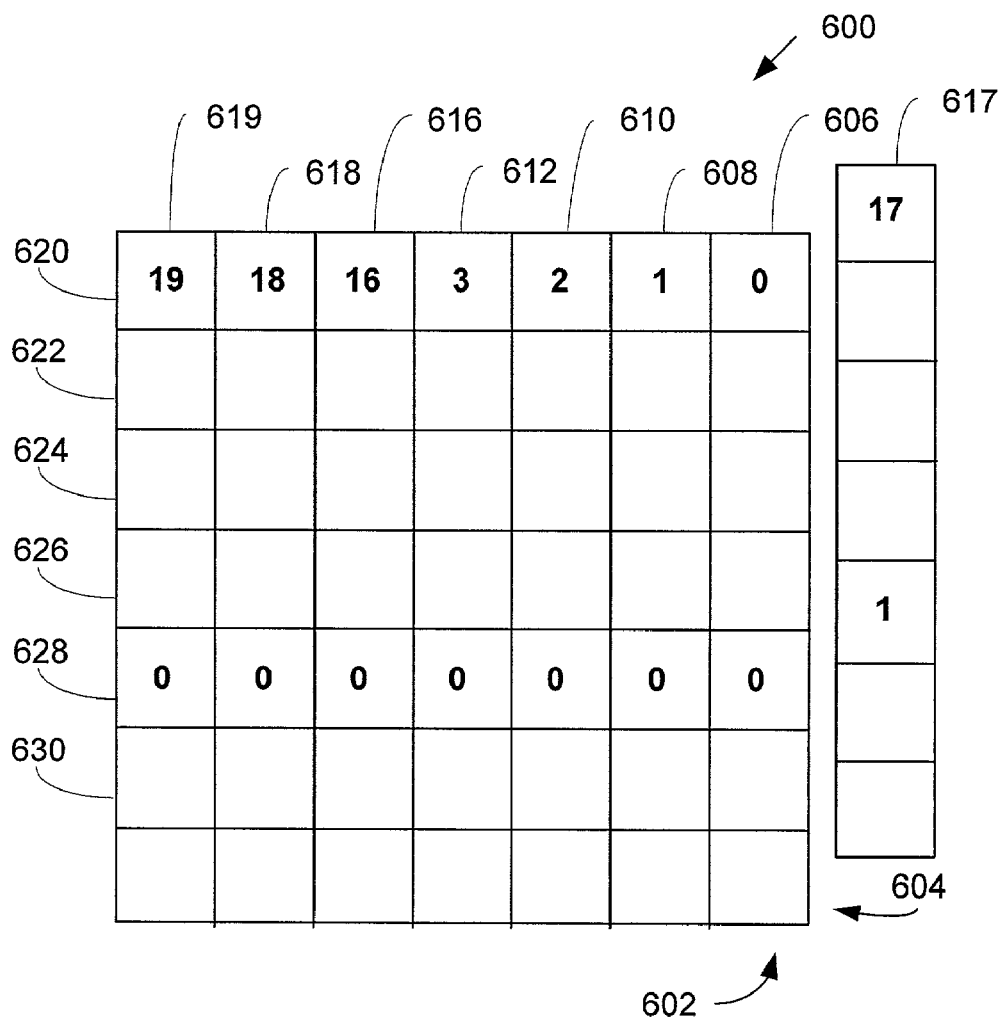

Now assume in this example that the packet is greater than 32-bytes in length. With reference to FIGS. 9A and 9B, DRC 504 (FIG. 5) then writes entry 617 back into shift structure 600 with input-ready field 628 enabled. In one configuration of the present embodiment, as depicted in FIG. 9A, entry 617 can be written to the end of shift structure 600. As all of the other entries 602 have input-ready fields 628 disabled, comparison-logic circuit 640 (FIG. 6) then ripples entry 617 back to the head of shift structure 600. However, this can be time consuming and can waste clock cycles. As such, as depicted in FIG. 9B, in another configuration, comparison-logic circuit 640 (FIG. 6) is configured to compare an entry being written back into shift structure 600 to the entries currently in shift structure 600. Accordingly, in this example, entry 617 is written back to the head of shift structure 600 and the remaining entries 606, 608, 610, 612, 616, 618, and 619 are shifted back.

Figure 10:
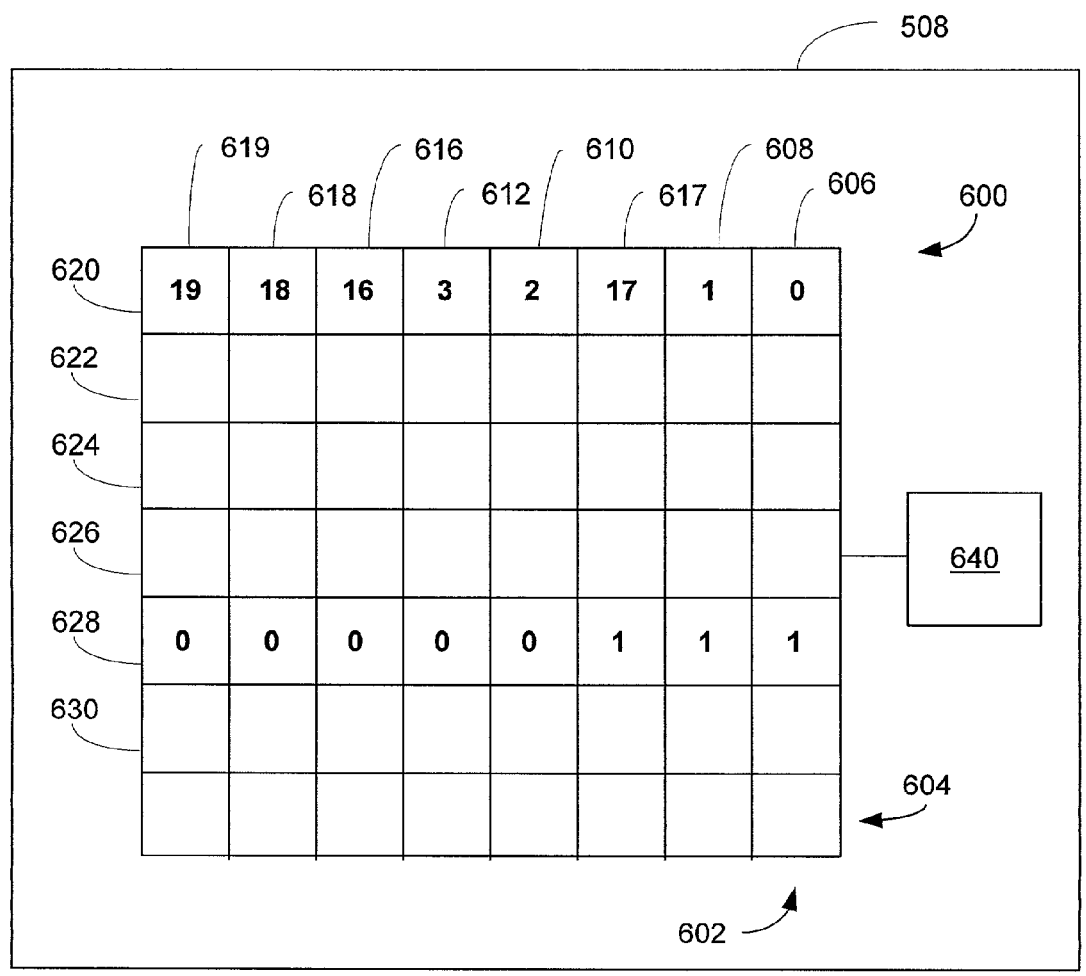

If there are other entries 602 with input-ready field 628 enabled, then entry 617 is written back to the end of those other entries 602. For example, with reference now to FIG. 10, assume that entries 606 and 608 have input-ready fields 628 enabled when entries 617 is being written back. As such, entry 617 is written back behind entries 606 and 608. Again, in one embodiment, entry 617 can be written to the end of shift structure 600, then comparison-logic circuit 640 can ripple entry 617 behind entry 608. Alternatively, in another embodiment, entries 610, 612, 616, 618, and 619 can be shifted back and entry 617 can then be written back behind entry 608.

With reference now to FIG. 5, when a packet is greater than 32-bytes in length, DRC 504 writes the descriptor of the packet read from queue 302 to perMDU 510. More particularly, DRC 504 writes the portions of the descriptor relevant to processing the remaining portions of the packet, such as length of the packet, and the like. Moreover, when data is written to LST 306, it is written with a ready bit entered after every 32-byte increment.

Figure 11:
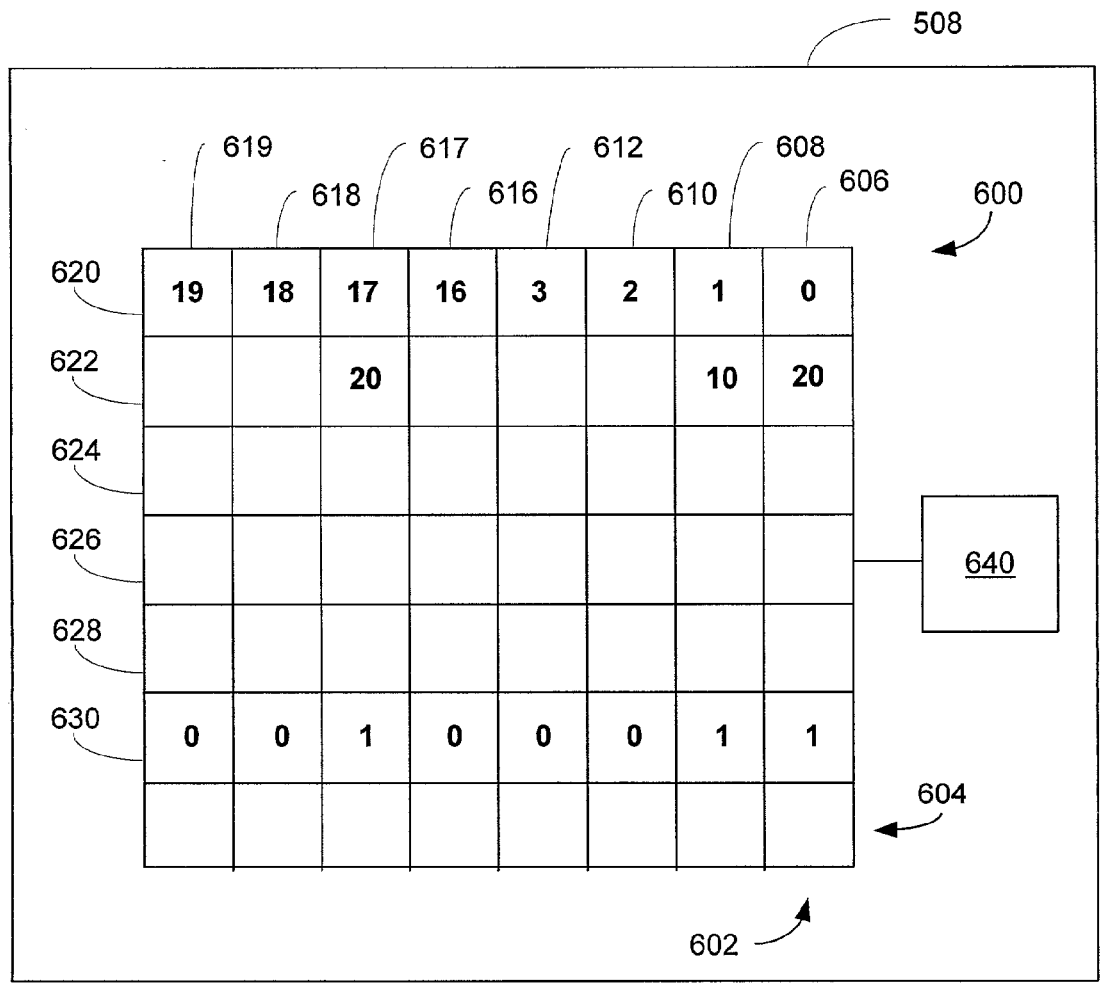

Now assume that when PPA 106 (FIG. 1) was initialized, channels 0, 1, and 17 were enabled. Also assume that channels 0, 1, and 17 are assigned priorities of 20, 10, and 20, respectively. Accordingly, as depicted in FIG. 11, enable fields 630 of entries 606, 608, and 617 associated with channels 0, 1, and 17, respectively, are enabled. In this example, enable fields 630 that are enabled are indicated with a "1" while enable fields 630 that are disabled are indicated with a "0". It should be recognized, however, that various indicators can be used. As further depicted in FIG. 11, priority fields 622 of entries 606, 608, and 617 are set for priorities 20, 10, and 20, respectively. It should be recognized, however, that any priority indicator can be utilized.

Figure 12:
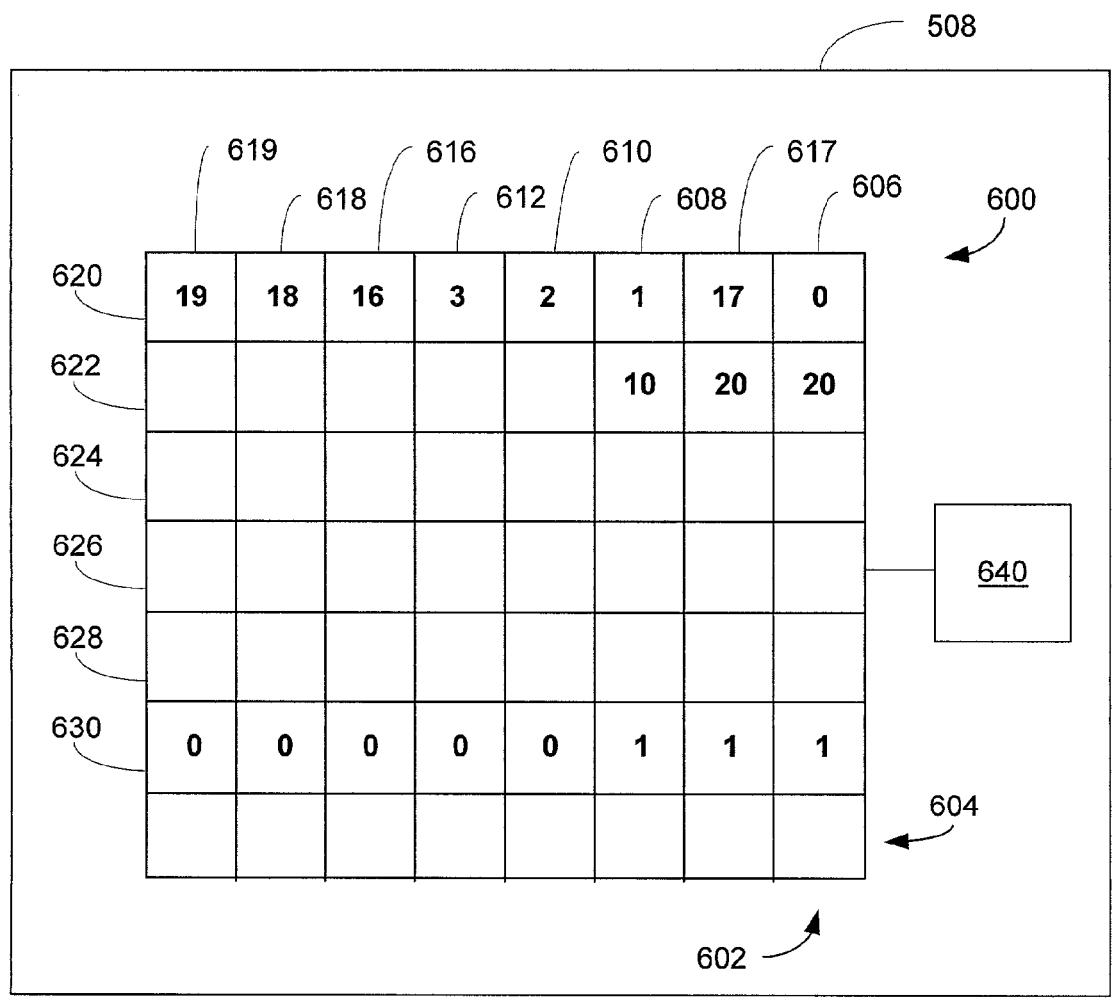

As described above, entries 602 with enable fields 630 enabled are sorted ahead of entries 602 with enable fields 630 disabled. Additionally, entries 602 with higher priorities are sorted ahead of entries 602 with lower priorities. Accordingly, with reference to FIG. 12, entry 606 is shifted to the head of shift structure 600, then entry 617, followed by entry 608. In this example, higher numbers (i.e., 20) were assumed to have higher priorities. It should be recognized, however, that various priority schemes can be utilized.

Figure 13:
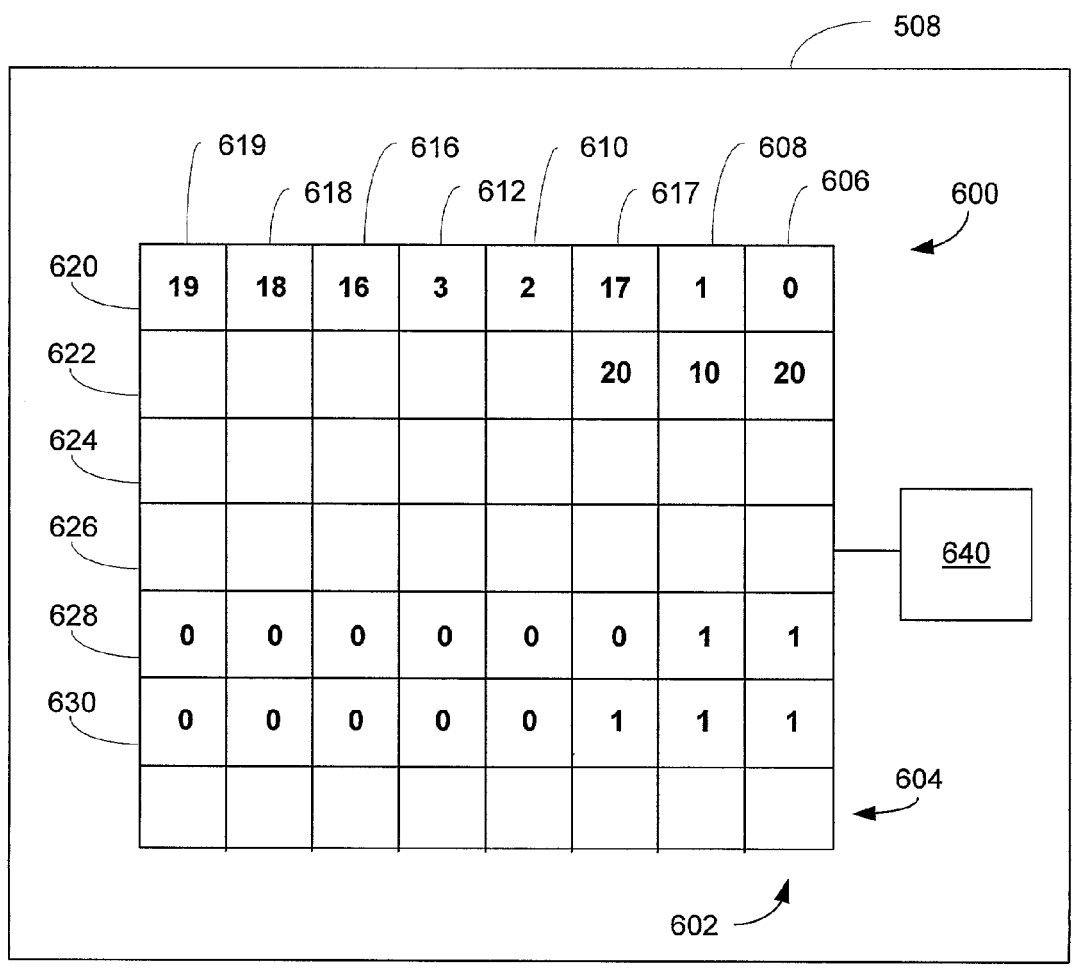

Now assume that packets are to be sent out through channels 0 and 1. With reference now to FIG. 5, software writes descriptors into queues 302-0 and 302-1. With reference now to FIG. 13, software also enables input-ready field 628 of entries 606 and 608. As depicted in FIG. 13, shift structure 600 is sorted such that entry 606 remains at the head, then entry 608, then entry 617. Although entry 617 has a higher priority than entry 608, entry 608 is shifted ahead of entry 617 because entry 608 has a ready entry 628 enabled.

With reference to FIG. 5, DRC 504 reads entry 606 (FIG. 13) and instructs RQM 502 to read the descriptor in queue 302-0. DRC 504 then issues a dm request to retrieve the packet from memory. Additionally, DRS 506 can be configured to determine the address in memory to access based on the descriptor read from queue 302.

With reference to FIG. 13, if the packet is less than 32-bytes, then DRC 504 writes entry 606 back with input-ready field 628 disabled. Accordingly, entry 606 is written back behind entry 619, then entry 608 is processed. However, if the packet is greater than 32-bytes, then DRC 504 (FIG. 5) writes entry 606 back with input-ready field 628 enabled. In this example, entry 606 is written back at the head of shift structure 600 because it has a higher priority than entry 608. In this manner, a channel with a higher priority can starve out a channel with a lower priority.

Figure 14:
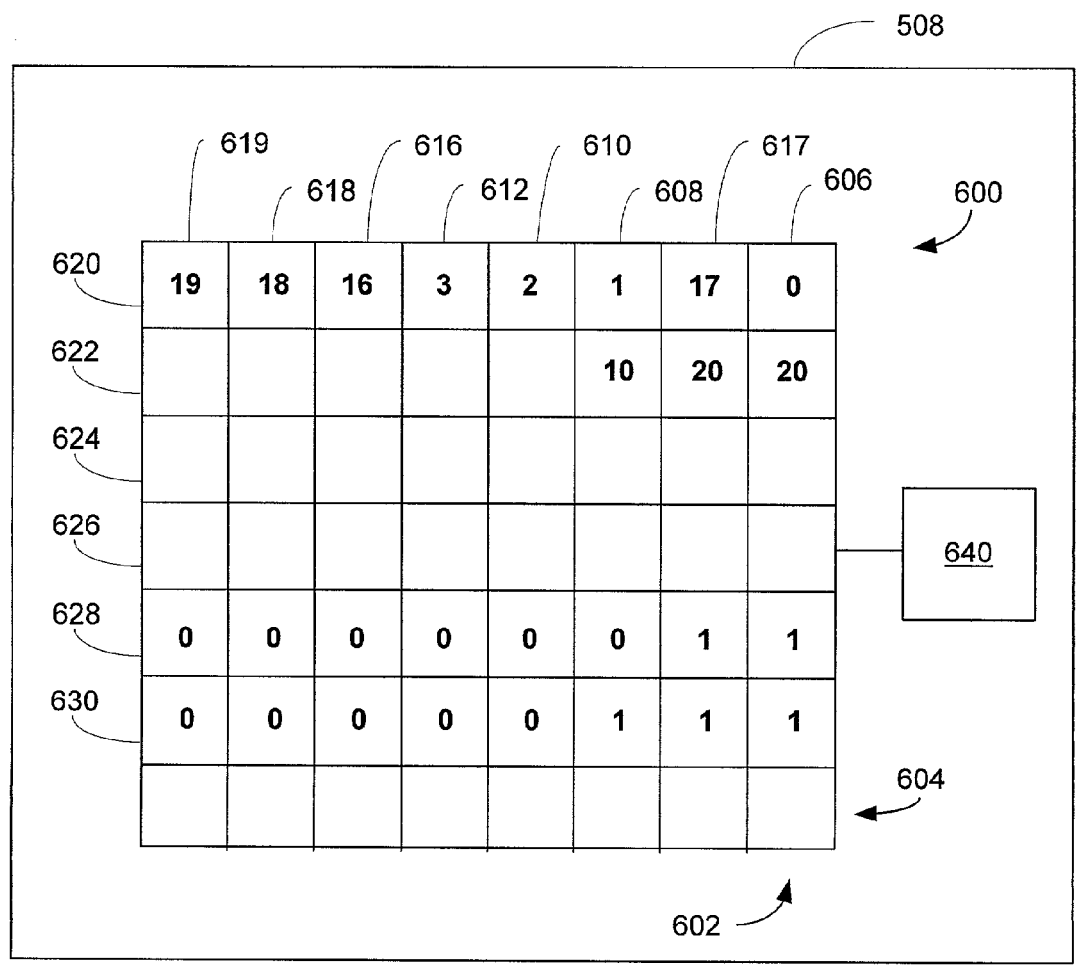

With reference now to FIG. 14, assume that packets are to be sent out through channels 0 and 17. As such, input-ready fields 628 of entries 606 and 617 are enabled. Accordingly, entry 606 is shifted to the head of shift structure 600, followed by entry 617. Now assume that the packet processed for channel 0 is larger than 32 bytes in length. As such, entry 606 is written back to shift structure 600 with input-ready field 628 enabled. Consequently, entry 606 is written behind entry 617 since they have the same priority. In this manner, channels at the same priority level are sorted using a round-robin scheme.

With reference again to FIG. 5, as described earlier, PSF 308 is configured to take data (i.e., a packet or a portion of a packet) from LST 306 and send it out on the ports 310 (FIG. 4). With reference to FIG. 4, as further described above, each PSF 308 is configured to service up to 16 channels. As such, with reference now to FIG. 5, PSF 308 includes a scheduler 516 configured to schedule the processing of these channels. As depicted in FIG. 5, PSF 308 also includes a RAM read sequencer (RRS) 518, an output data control (ODC 526), a output data RAM (ODR) 528, an ACK (Acknowledgement) control module (ACM) 522, and an ACK RAM module (ARM) 524.

Scheduler 516 operates similarly to scheduler 508. However, as PSF 308 is configured to service up to 16 channels, scheduler 516 is configured to also service up to 16 channels. As such, with reference to FIG. 15, scheduler 516 includes a shift structure 1500 having 16 entries 1502. shift structure 1500 also includes various fields 1504 similar to fields 604 (FIG. 6) in shift structure 600 (FIG. 6), such as channel number field, a priority field, a packet-in-flight field, an output-ready field, an input-ready field, and an enable field.

With reference again to FIG. 5, as described above, data from memory are stored in LST 306 in 32-byte increments. More particularly, when a packet or a portion of a packet is retrieved from memory, it is stored as an entry in LST 306 and a valid bit is set. When an entry is read from LST 306, the valid bit is re-set. In the present embodiment, LST 306 includes a RAM 512 configured to store the retrieved packets. LST 306 also includes a Packet Data Ram Control (PDC) 514 configured to set and reset the valid bit in RAM 512 as entries are written and read from LST 306.

Figure 15:
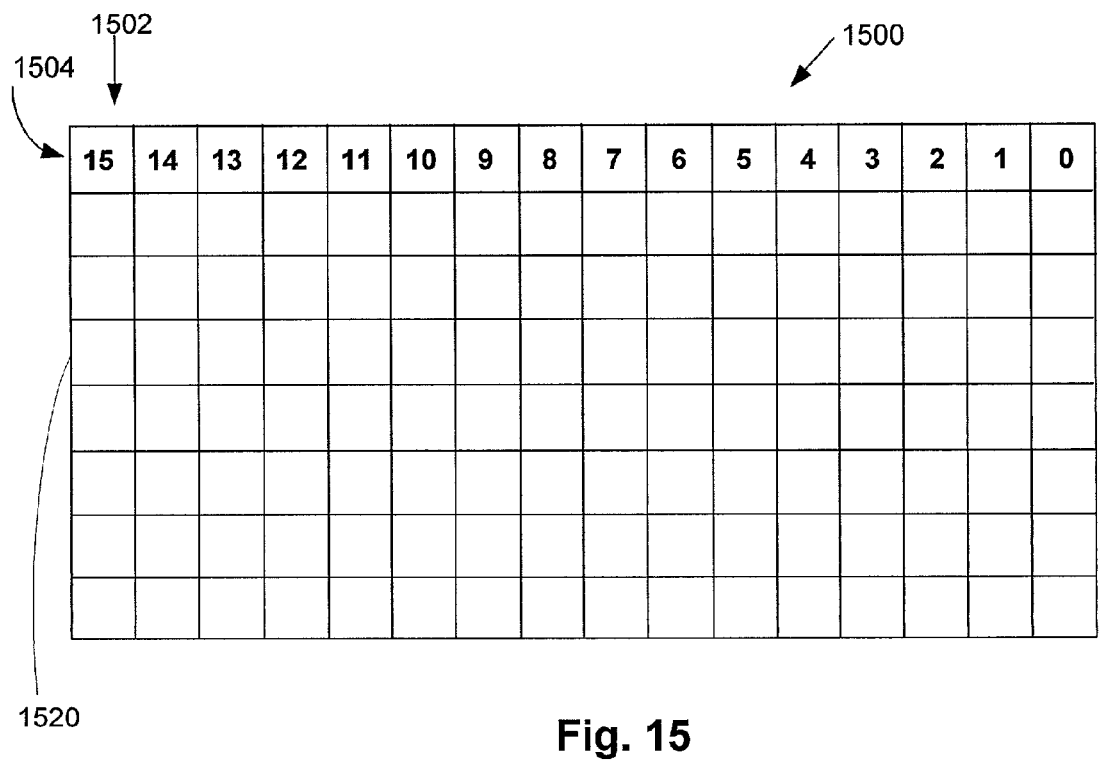
FIG. 15 is a diagram of another scheduler in accordance with one embodiment of the present invention.

At the same time the valid bits are set in LST 306, the input-ready field in scheduler 516 is also set. In the present embodiment, RRS 518 is configured to read the entry from scheduler 516. ODC 526 then reads out of LST 306 based on the entry read from scheduler 516. For example, assume that the enable field for channel 0 is enabled in scheduler 516. Assume that this is the only enabled entry in shift structure 1500 (FIG. 15). As such, RRS 518 reads this entry, then ODC 526 access LST 306 associated with the channel number field in the entry. In this example, ODC 526 reads data from LST 306-0 (FIG. 4).

After reading data from LST 306, ODC 526 then writes to ODR 528. In one embodiment, ODR 528 is configured as a FIFO RAM. Additionally, ODR 528 is configured to operate as an asynchronous FIFO between the operating clock of DMA 216 (FIG. 2) and the clock of LIP 218 (FIG. 2). All of the logic shown in FIG. 5 operate on a core clock, while LIP 218 (FIG. 2) operates on a separate clock. As such, ODR 528 facilitates transfer of data across these two clocks.

With reference again to FIG. 15, in shift structure 1500, the output-ready field is configured as an ACK field 1520. In accordance with one aspect of the present invention, ACK field 1520 is configured to indicate whether a port 310 (FIG. 4) is ready to sent out a package. More particularly, with reference to FIG. 5, ARM 524 can be configured with a credit value. This credit value can be set equal to the number of buffers on the device connected to port 310 (FIG. 4) that will receive the packet sent through port 310 (FIG. 4). In the present embodiment, this credit value is set to 32. It should be recognized, however, that the credit value can be set equal to any desired number.

When a package is sent out on a channel on a port 310 (FIG. 4), ACM 522 decrements the credit value in ARM 524. When an acknowledgement is received from the device receiving the packet, ACM 522 increments the credit value in ARM 524. If the credit value for a channel is non-zero, then ACM 522 enables the ACK field 1520 (FIG. 15). If the credit value for a channel is zero, then ACM 522 disables the ACK field 1520 (FIG. 15). For example, ACM 522 can set ACK field 1520 (FIG. 15) to "1" to enable it and to "0" to disable it. It should be recognized, however, that various values can be used. In the present embodiment, entries 1502 (FIG. 15) with ACK fields 1520 (FIG. 15) enables are sorted ahead of those with ACK fields 1520 (FIG. 15) disabled.

With reference now to FIG. 2, as described above, a framer device can be connected to the other end of LIP interface 202. In one application of the present invention, the framer device is connected to LIP interface 202 through a Synchronous Optical Network (SONET) connection. Assume that this framer device is designed to run at speeds up to Optical Carrier (OC) number 48 (i.e., 2.488 gigabits per second). This can be a single logical channel at OC48 or a number of logical channels whose total data rate is less than or equal to OC48. For example, assume that the framer is configured with two channels operating at OC12 (i.e., 622.08 megabits per second) and eight channels operating at OC3 (i.e., 155.52 megabits per second) for a sum total of OC48. The framer device also has some buffering associated with each of these channels. This buffering is used to hold packet data for that channel.

Assume that in this application, with reference to FIG. 5, schedulers 508 and 516 are configured with priority fields 622 (FIG. 6) that correspond to the OC rates of the channels on the framer device. In the present example, assume that channels 4 and 5 are assigned a priority of 12 and channels 0 to 3 and 6 to 9 are assigned a priority of 3.

Also assume that software had packets to be sent out on all these channels and wrote the corresponding descriptors to queues 302 (FIG. 4). Initially, the two entries with the higher priority (i.e., 12) would get serviced one after the other, thus starving out the lower priority channels. As described earlier, LIP interfaces 202 (FIG. 2) and 218 (FIG. 2) can operate at about 16 bits every 200 megahertz (MHz). After removing any overhead, this rate can still exceed OC48. As such, data for the channels with the higher priorities (i.e., channels 4 and 5) would get sent out at above OC-48 rate until the buffers in the framer device for these two channels get full. At that point, the ready bits for these two entries in scheduler 516 would be disabled (since the framer device is no longer ready). The lower priority entries would then start getting serviced. As time goes by, the framer device frees some of the buffers for the two OC-12 channels (i.e., channels 4 and 5). The corresponding input-ready fields then get set and scheduler 516 (FIG. 18) again starts to service those channels. In this manner, priority fields 622 (FIG. 6) can be utilized to divide up the bandwidth of the line into multiple logical channels of different speeds.

Although the present invention has been described in conjunction with particular embodiments illustrated in the appended drawing figures, various modification can be made without departing from the spirit and scope of the present invention. Therefore, the present invention should not be construed as limited to the specific forms shown in the drawings and described above.

We claim:

1. An apparatus for scheduling a Direct Memory Access (DMA) device having multiple channels, comprising:
    a shift structure having a plurality of entries corresponding to the multiple channels to be scheduled, wherein each entry in said shift structure includes a plurality of fields, and wherein each entry includes a weight that is determined based on said plurality of fields; and
    a comparison-logic circuit configured to sort said entries based on their respective weights.

2. The apparatus of claim 1, wherein said comparison-logic circuit is configured to compare the weight of an entry being written into said shift structure with the weight of said entries in said shift structure.

3. The apparatus of claim 2, wherein said comparison-logic circuit is configured to insert said entry being written into said shift structure behind entries with higher weights and to shift entries with lower weights behind said entry being written into said shift structure.

4. The apparatus of claim 1, wherein said weight includes a number having a plurality of bits, and wherein each of said plurality of fields are assigned to a set of bits of said weight.

5. The apparatus of claim 4, wherein said plurality of fields includes:
    an enable field, wherein said enable field is assigned to the-most-significant bit of said weight;

an output-ready field, wherein said output-ready field is assigned to the second-most-significant bit of said weight;
an input-ready field, wherein said input-ready field is assigned to the third-most-significant bit of said weight;
an in-flight field, wherein said in-flight field is assigned to the fourth-most significant bit of said weight; and
a priority field, wherein said priority field is assigned to the fifth-most significant bit to the tenth-most significant bit of said weight.

6. The apparatus of claim 5, wherein said priority field includes a plurality of priority levels, and wherein higher priority levels are assigned higher weights.

7. The apparatus of claim 6, wherein the channels of the DMA are connected to a synchronized optical network (SONET) having a plurality of optical carrier (OC) numbers, and wherein said plurality of entries are assigned priority levels corresponding to the OC numbers of the channels associated with said plurality of entries.

8. The apparatus of claim 7, wherein:
a first set of entries associated with channels operating at OC 12 are assigned a priority level of 12; and
a second set of entries associated with channels operating at OC 3 are assigned a priority level of 3.

9. The apparatus of claim 1, wherein said shifting structure is a First-In-First-Out (FIFO) device.

10. A method of scheduling multiple channels on a Direct Memory Access (DMA) device, comprising:
writing a plurality of entries in a shift structure, wherein each entry is associated with a channel on the DMA, and wherein each entry includes a plurality of fields;
assigning weights to said entries based on said plurality of fields;
sorting said entries based on said weights, wherein an entry having the highest weight is sorted to the head of said shift structure; and
reading said entry from the head of said shift structure to service the channel associated with said entry.

11. The method of claim 10 further comprising the step of:
writing said entry read from the head of said shift structure back into said shift structure after the channel associated with said entry is serviced.

12. The method of claim 11, wherein said writing step further comprises:
inserting said entry back into said shift structure behind entries in said shift structure with higher weights; and
shifting said entries in said shift structure with lower weights behind said entry to be written back.

13. The method of claim 10, wherein said weight includes a number having a plurality of bits, and said assigning step further comprises:
assigning each of said plurality of fields to a set of bits of said weight.

14. The method of claim 13, wherein said plurality of fields includes:
an enable field, wherein said enable field is assigned to the-most-significant bit of said weight;
an output-ready field, wherein said output-ready field is assigned to the second-most-significant bit of said weight;
an input-ready field, wherein said input-ready field is assigned to the third-most-significant bit of said weight;
an in-flight field, wherein said in-flight field is assigned to the fourth-most significant bit of said weight; and
a priority field, wherein said priority field is assigned to the fifth-most significant bit to the tenth-most significant bit of said weight.

15. The method of claim 14 further comprising the step of:
enabling said input-ready field of an entry when the channel associated with said entry is to be serviced.

16. The method of claim 14, wherein said priority field includes a plurality of priority levels, and further comprising the step of:
assigning higher weights to higher priority levels.

17. The method of claim 16, wherein the channels are connected to a synchronized optical network (SONET) having a plurality of optical carrier (OC) numbers, and further comprising the step of:
assigning priority levels corresponding to the OC numbers of the channels.

18. The method of claim 17 further comprising the steps of:
assigning a priority level of 12 to a first set of entries associated with channels operating at OC 12; and
assigning a priority level of 3 to a second set of entries associated with channels operating at OC 3.

19. A method of scheduling multiple channels, said method comprising:
assigning weights to a plurality of entries in a shift structure, wherein each entry is associated with a channel, and wherein each entry includes a plurality of fields;
sorting said entries based on said weights, wherein an entry having the highest weight is sorted to the head of said shift structure;
reading said entry from the head of said shift structure;
servicing the channel associated with said entry read from said shift structure; and
writing said entry read from said shift structure back into said shift structure.

20. The method of claim 19, wherein said writing step further comprises:
inserting said entry back into said shift structure behind entries in said shift structure with higher weights; and
shifting said entries in said shift structure with lower weights behind said entry to be written back.

21. The method of claim 19, wherein said weight includes a number having a plurality of bits, and said assigning step comprises:
assigning each of said plurality of fields to a set of bits of said weight.

22. The method of claim 19, wherein said plurality of fields includes a priority field having a plurality of priority levels.

23. The method of claim 22, wherein the channels are connected to a synchronized optical network (SONET) having a plurality of optical carrier (OC) numbers, and further comprising the step of:
assigning priority levels corresponding to the OC numbers of the channels.

24. The method of claim 23 further comprising the steps of:
assigning a priority level of 12 to a first set of entries associated with channels operating at OC 12; and
assigning a priority level of 3 to a second set of entries associated with channels operating at OC 3.

* * * * *